United States Patent [19]

Manservisi

[11] 4,215,774

[45] Aug. 5, 1980

[54] TRANSFERRING AND COMBINING DEVICE

[75] Inventor: Renato Manservisi, Bologna, Italy

[73] Assignee: CIR-S.p.A.-Divisione SASIB, Bologna, Italy

[21] Appl. No.: 940,139

[22] Filed: Sep. 6, 1978

[30] Foreign Application Priority Data

Sep. 21, 1977 [IT] Italy .............................. 12771 A/77

[51] Int. Cl.² ............................................. B65G 47/30
[52] U.S. Cl. ..................................... 198/444; 198/450
[58] Field of Search ............... 198/424, 448, 449, 450, 198/456, 457, 458, 459, 481, 598, 613, 444

[56] References Cited

U.S. PATENT DOCUMENTS

| | | | |
|---|---|---|---|
| 2,792,922 | 5/1957 | Malhiot | 198/481 X |
| 3,083,809 | 4/1963 | Fischer | 198/457 X |
| 3,136,320 | 6/1964 | Molins et al. | 198/430 |
| 3,176,821 | 4/1965 | Eldred et al. | 198/448 X |
| 3,363,741 | 1/1968 | Dierksheide | 198/598 X |
| 3,537,570 | 11/1970 | Sillars | 198/598 X |
| 3,845,851 | 11/1974 | Decker et al. | 198/449 |
| 4,040,381 | 8/1977 | Molins et al. | 198/450 X |

FOREIGN PATENT DOCUMENTS

| | | | |
|---|---|---|---|
| 692362 | 8/1964 | Canada | 198/459 |
| 1330300 | 9/1973 | United Kingdom | 198/449 |

Primary Examiner—James L. Rowland
Attorney, Agent, or Firm—Spencer & Kaye

[57] ABSTRACT

The device for transferring and combining cigarette packs coming out from two packers operating in parallel, in order to obtain a single feeding line for a wrapping machine, comprises two parallel conveyors which receive the packs from the cigarette packers, and a transversal conveyor which receives the packs from both mentioned parallel conveyors and feeds them to the wrapping machine. In correspondence of the discharge end of each parallel conveyor there is arranged a revolving transfer wheel which transfers the packs from the discharge end of the parallel conveyor to the underlying transversal conveyor, through an arcuate transfer channel. The two transfer wheels are driven in such a manner that each pack deposited by the second transfer wheel, i.e. the wheel which is arranged subsequently after the other transfer wheel, or first transfer wheel, in the direction of conveyance of the transversal conveyor, comes to lie on the said transversal conveyor between two packs deposited by the said first preceding transfer wheel.

3 Claims, 4 Drawing Figures

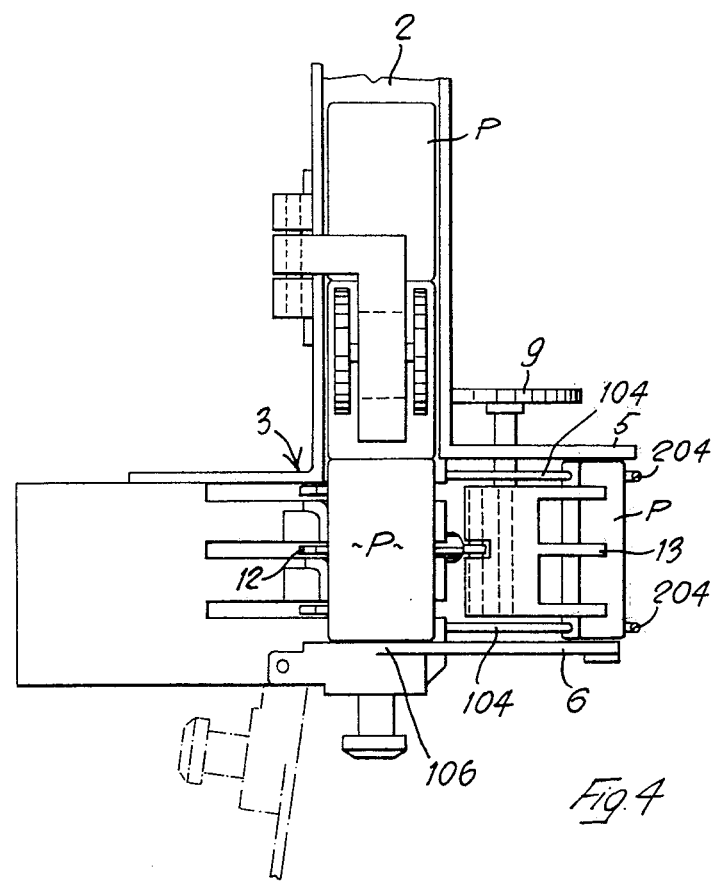

TRANSFERRING AND COMBINING DEVICE

SUMMARY OF THE INVENTION

This invention relates to machines which sequentially handle series of articles equal to each other, such as packaging machines or cigarette making machines, in particular, cigarette packing machines and cellophane wrapping machines (cellowrappers) which wrap each cigarette pack in a cellophane wrapper.

Cigarette packers and cellowrappers are usually mounted in line, to obtain a continuous operating chain, in which the articles being handled are transferred sequentially and at a certain speed rate from one machine to the following one.

In these arrangements of machines in line, it happens sometimes that one machine which has to handle the articles received from another machine upstream of it in the operating line, has a production rate twice as high as that of the upstream machine. Thus, for instance, the production rate of a cigarette pack cellowrapper can be twice as great as that of a packer. In this case, if it is desired to obtain the maximum practical utilization of the plant, it is convenient to couple to the same cellowrapper a pair of parallel-operating packers, by composing the two lines of packs coming out of these machines, so as to form a single feeding line which supplies the packs to the cellowrapper. Consequently, each machine can operate at its own production rate, and the plant can be used in a more rational manner.

There exists, therefore, the problem of composing the lines of packs coming out of two parallel-operating packers into a single line of packs to be fed to the single cellowrapper coupled to the above two packers.

This invention is precisely aimed at solving this problem and, for this purpose, it proposes a transferring and combining device which not only composes the two outputs of the packers by alternatively transferring the packs from them, with an intercalary operation, and by composing them into a single transversal line for the feeding of the cellowrapper, but contemplates also the case that one packer or the other may be temporarily stopped, in which case the device reacts in such a way as to avoid also the stopping of the cellowrapper.

These and other features of the invention and the resulting advantages, will be understood from the following detailed description of a preferred embodiment of it, made with reference to the attached drawings.

BRIEF DESCRIPTION OF THE DRAWINGS

FIG. 4 is a schematic plan view from the top of a detail of the device.

DESCRIPTION OF THE PREFERRED EMBODIMENT

Figure 1:
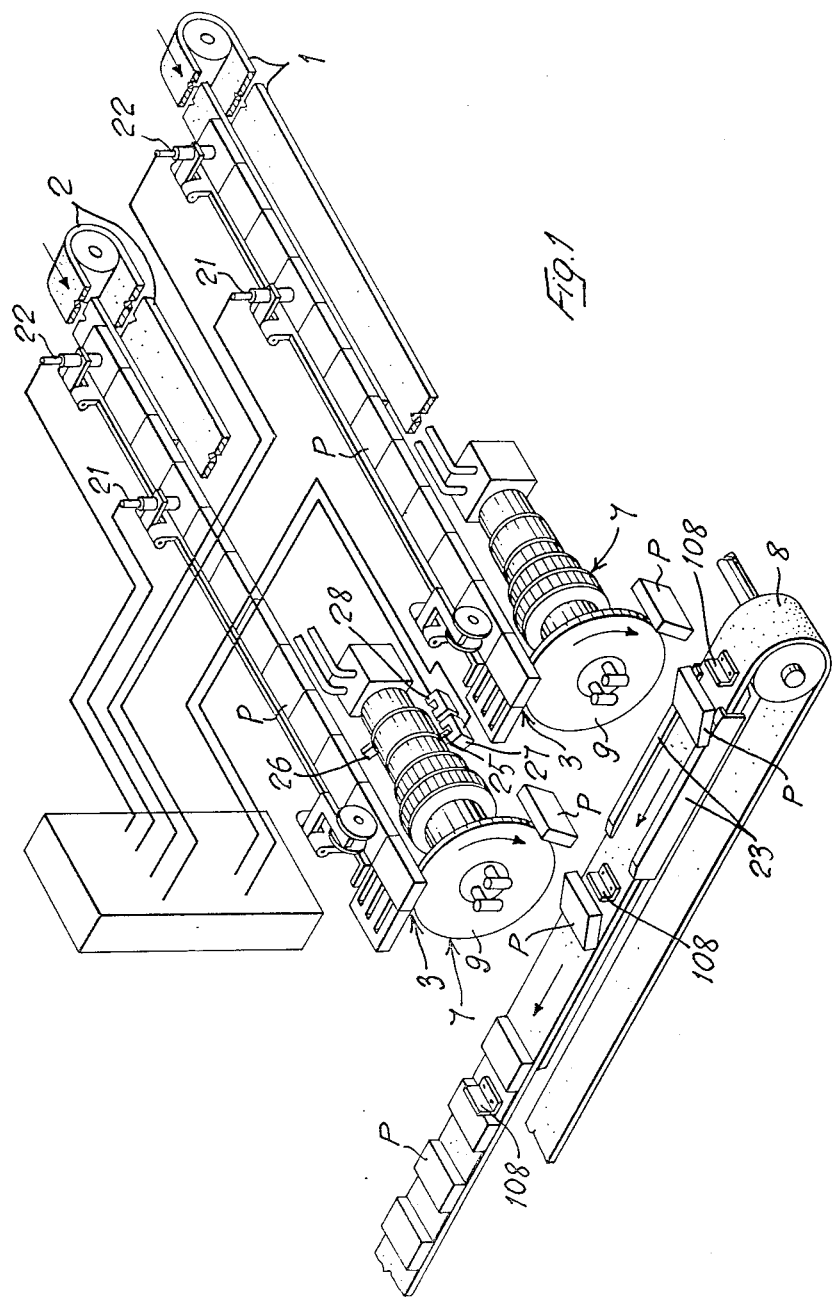
FIG. 1 is a schematic perspective view of a transferring and combining device which obtains a single feeding line of articles from two lines of the same articles.
Figure 2:
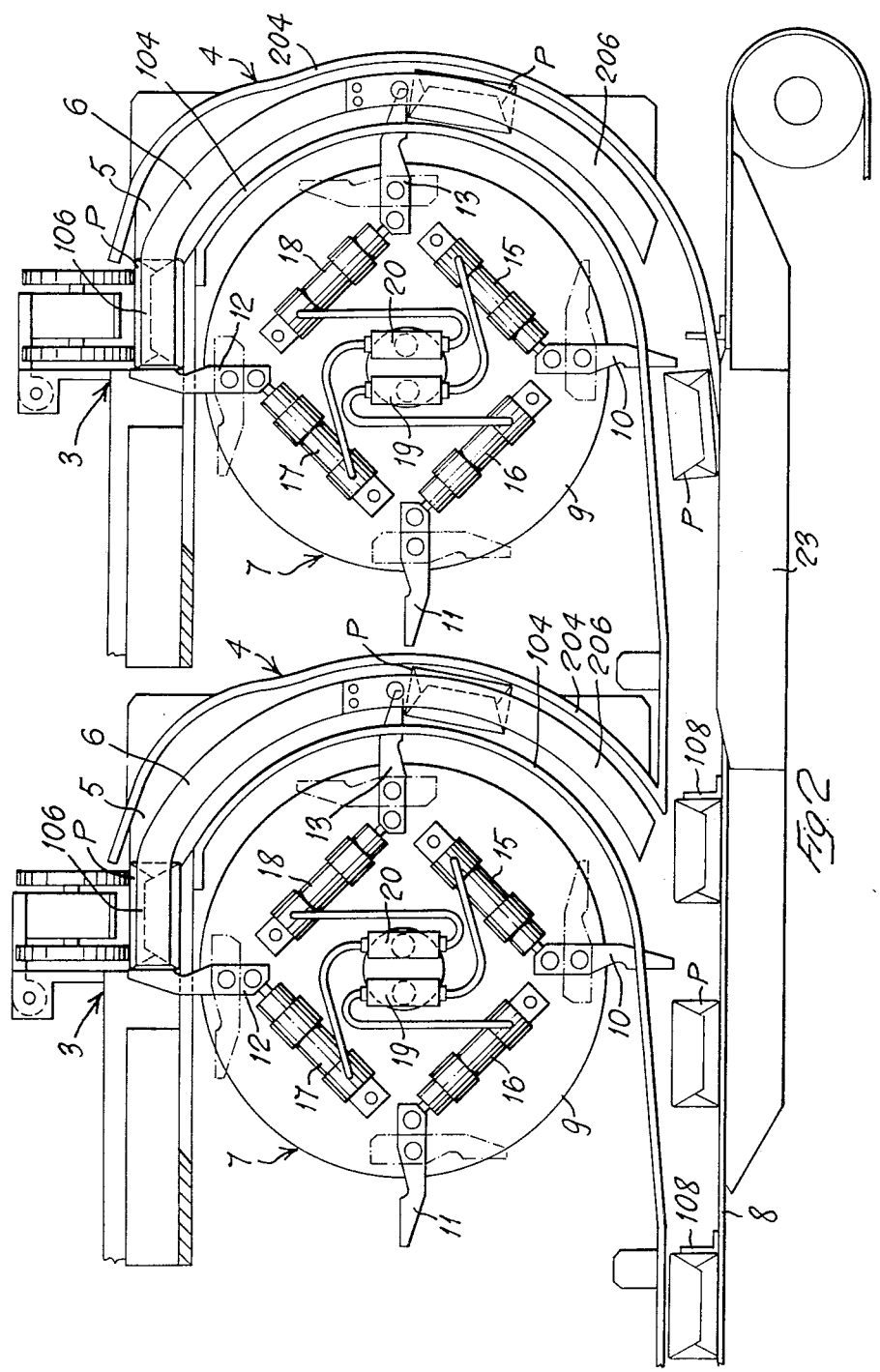
FIG. 2 is a front elevation, in another scale, which illustrates a detail of the transferring and combining device illustrated in FIG. 1.

With reference to FIGS. 1 and 2, there is illustrated the device according to the invention, which is particularly adapted to operatively couple, to the same cellowrapper, a pair of packers designed to operate in parallel, each with a production rate which is half the speed rate of the cellowrapper. The articles handled by these machines are cigarette packs P to which the cellowrapper must apply a cellophane wrapper.

The two lines of packs coming out of the respective packers (not illustrated) consist of two endless conveying belts 1 and 2 which run parallel and interspaced and each of which conveys the respective cigarette packs P to a corresponding transfer station 3.

Each transfer station 3 is arranged before the inlet of a transfer channel 4, which substantially runs along a broad circumference arc, and practically descends along a vertical plane.

This channel 4 is delimited by two pairs of interspaced side guides, of which those on the inner side of the arc-curved channel are indicated with 104 while those on the outer side are indicated with 204. The delimitation of each channel 4 is completed by a back plate 5 and a front arcuate guide 6. The latter projects in correspondence of the inlet of the respective channel 4 with a rectilinear portion 106, which has the function of abutment member for the packs P arriving on belt 1 (or 2); while, at the other end, that is towards the lower outlet of channel 4, guide 6 terminates with an end portion 206, flexible and adjustable in its length.

Each channel 4 extends concentrically and partially around a rotating wheel 7 whose function is to engage individually packs P from the respective station 3, to cause them to slide along channel 4 and to deposit them on the transversal feeding line, consisting of an endless belt 8, provided transversally with paddles 108 fixed to the belt and regularly interspaced between each other.

The rotary transferring wheel 7 consists of a disk 9, mounted to revolve axially, which has pivoted, in a peripheral position, a crown of four engaging paddles 10, 11, 12, 13 equispaced between each other.

Figure 3:
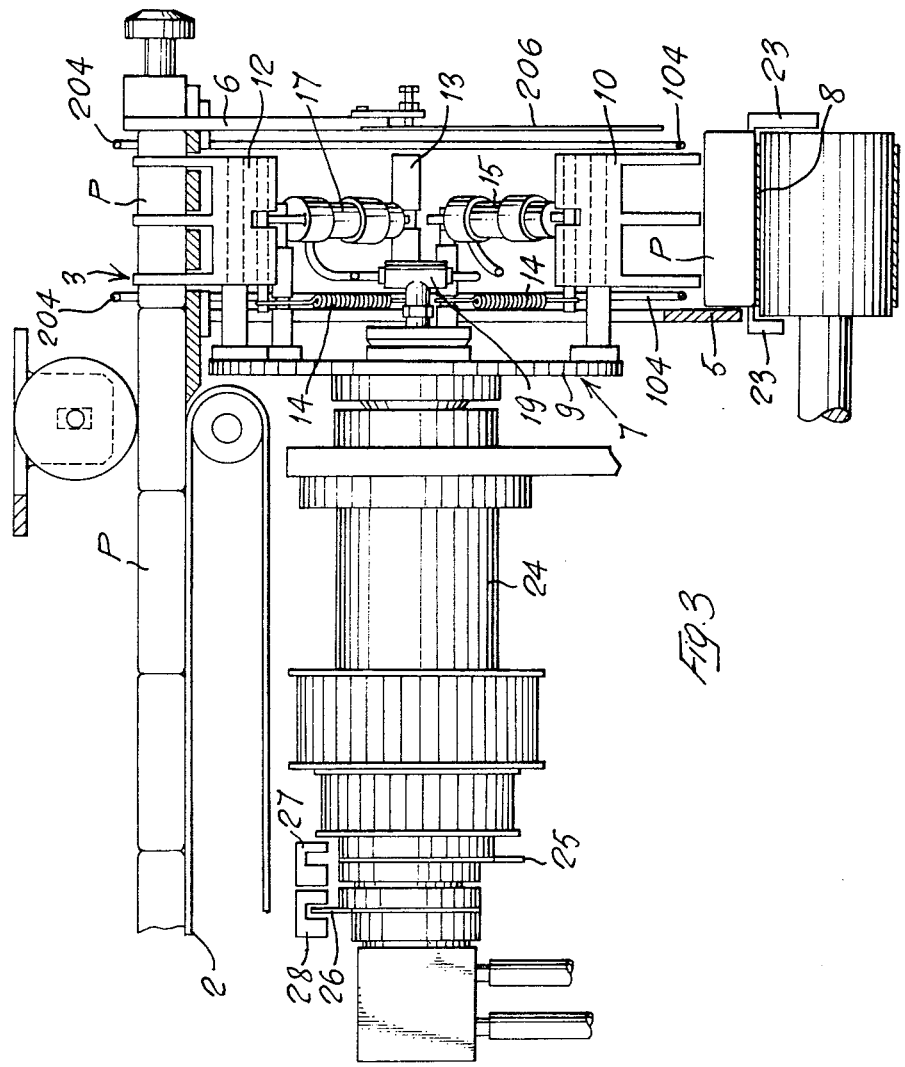
FIG. 3 is a vertical sectional view of the device according to the invention, sectioned in correspondence of one of the conveying belts.

Each of these paddles is maintained in radial position, that is, in active position, by a respective spring 14 (see FIG. 3) and from this position it can be moved into a tangential position that is, inactive, through the action of respective pneumatic cylinders 15, 16, 17, 18.

The two rotary wheels 7 are moved by the same driving means and operated in timed rotation, whereby the relative position of the paddles of a disk 9 compared to the position of the paddles of the other disk remains always unchanged during the simultaneous rotation of the two disks.

The air under pressure for operating the four pneumatic cylinders 15, 16, 17, 18 mounted on each disk 7 is fed to the same disk by a current type rotary distributor through respective solenoid valves 19 and 20. More particularly, solenoid valve 19 controls the air feed to cylinders 15 and 16, while solenoid valve 20 controls the feed to cylinders 17 and 18. p Each conveying belt 1, 2 is associated to a pair of sensors 21, 22, spaced between each other along a section of the upper run of the respective belt. Each sensor can feel the passage of a cigarette pack on the belt. In the embodiment described herewith, these sensors are of the electromagnetic type and can sense the passage of a pack due to the fact that the pack has an inner foil wrapper. Obviously, the sensors can be of any suitable type, and can consist, for instance, of photoelectric cell sensors, of microswitch mechanical feelers, or of capacitive sensing units.

Sensors 21 and 22 operate jointly in such a way that the "disactivation" of both, referred to the motion of the belt which carries an uninterrupted row of packs, indicates that the tail of the row has a length lesser than a certain minimum, defined by the position of one (21) of these sensors, which is the one nearest to the transfer station 3; while the simultaneous "activation" of both sensors 21, 22 indicates that the length of the row tail is not lesser than the limit defined by the position of the other sensor 22. Obviously, the disactivation of sensor 22 only indicates that the remaining tail length is included among the values defined by the positions of the sensors 21 and 22.

In relation to what has been exposed in the previous paragraph, it must be stated that the terms "activation" and "disactivation" referred to sensors 21 and 22 indicate generally a pair of distinct and typical "signalling conditions," typical of these sensing units.

Substantially, the function of sensors 21 and 22 is that of keeping under control the tail of the rows of packs P advancing on the respective belts 1 and 2, this control being required for the purpose which will be specified later.

Conveying belt 8 extends transversally to belts 1 and 2 and is provided with two side guides or supporting ridges 23 in the area of the outlet of channel 4 relating to the transfer from belt 1.

To the shaft 24 which actuates one of the two rotary transferring elements 7 (see FIG. 3) there are fastened two wing strobes 25, 26, offset between each other of 180° and associated, respectively, to two sensing units 27, 28 which consist of two so-called proximity switches. Each pair composed by a strobe and proximity switch forms a strobe control device. More particularly, the pair 25, 27 controls the compressed air feed to cylinders 15 and 16, while the pair 26, 28 controls the compressed air feed to cylinders 17 and 18.

The operation of the described device is the following:

If the row of packs P on belts 1 and 2 delivered by the respective packers (not illustrated) has such a length as to fall under the control of at least the respective sensor 21, this means that the tail of packs P on that belt has a length not lower than the predetermined minimum one. Under this condition the device operates regularly, as particularly illustrated in FIG. 2. In this condition of regular operation, the rows of packs P on belts 1 and 2 both fall under the control of the respective sensors 21. The engaging paddles 10, 11, 12 and 13 are subjected to the action of the respective positioning springs 14. Under the action of these springs, the engaging paddles 10, 11, 12, 13 of each of transferring disks 9 are maintained active in radial position whereby they sequentially engage the packs which follow each other in the corresponding station 3, and abut against the abutment members 106, and transfer them on the transversal belt 8, by causing them to slide along the corresponding transfer channel 4. In particular, the engaging paddles of disk 9 associated to belt 1, deliver the packs on the supporting ridges 23 which border belt 8 in the zone of the outlet of corresponding channel 4. These packs, so delivered, are engaged by paddles 108 of belt 8 which cause them to slide on these ridges 23 until they are deposited on said belt 8.

The engaging paddles of disk 9 associated to belt 2, deposit the packs directly on belt 8. By so doing, with an adequate timing between the two disks 9, there can be provided an arrangement whereby two cigarette packs P occupy the interspace between two consecutive paddles 108 on belt 8.

The purpose of ridges 23 is to ensure the spacing between two packs on belt 8.

Under normal operation of the device, as above described a feeding line is composed (on transversal belt 8) from the combination of the two outputs of two packers, operating at a production rate which is half compared to the rate of the cellowrapper which will receive the packs from said combined feeding line.

If the production rate of one packer decreases in comparison to that of the other, then it happens that the length of the tail of the respective row of packs decreases below the minimum value, which corresponds to the presence of the tail end pack under sensor 21. When this happens, the engaging paddles of the associated transferring disk 9, are disactivated that is, they are caused to oscillate from the radial to the tangential position. This is obtained with the intervention of pneumatic cylinders 15, 16, 17, 18 actuated in pairs by solenoid valves 19 and 20, whose intervention is controlled by the pairs of strobes 25, 27 and 26, 28. As already mentioned, the pair 25, 27 controls the compressed air feed to cylinders 15 and 16 through solenoid valve 19, while the pair 26, 28 controls the compressed air feed to cylinders 17 and 18 through solenoid valve 20.

More precisely, strobe controls 25, 27 and 26, 28 intervene in such a way that firstly the two consecutive paddles which have moved away from channels 4, are oriented into tangential position, thus allowing to the remaining two paddles to complete their function, and subsequently, also these two latter paddles are disactivated by bringing them into tangential position. Thus, in the illustrated example, paddles 10 and 11 will be first oriented into tangential position and then paddles 12 and 13. This disactivation of the engaging paddles of one of the transferring disks lasts until the length of the row of packs on the corresponding belt has returned to normality; afterwards the paddles are oriented two by two again into a radial position.

When the length of the row of packs on either one of belts 1, 2 exceeds the respective sensor 22, the latter produces a control signal which promotes the stopping of the corresponding packer upstream.

It is believed that the invention will have been clearly understood from the foregoing detailed description of the preferred embodiment. Changes in the details of construction may be resorted to without departing from the spirit of the invention, and it is accordingly intended that no limitation be implied and that the hereto annexed claims be given the broadest interpretation to which the employed language fairly admits.

I claim:

1. A device for transferring and combining articles which are advanced successively on at least two parallel conveyors (1 and 2), in such a manner as to form a single row of articles which are fed successively the one after the other on a transversal conveyor (8) arranged transversally and at a lower level with respect to the said parallel conveyors (1 and 2) characterized in that at the delivery end of each parallel conveyor (1,2) there is arranged a revolving transfer wheel (7) which transfers the articles from the respective parallel conveyor successively onto the said lower transversal conveyor (8), the said transfer wheels (7) being arranged one after the other with respect to the direction of conveyance of the transversal conveyor and being driven in such a manner that each article deposited by the second transfer wheel, i.e. the wheel which is arranged subsequently after the other transfer wheel, or first wheel, in the direction of conveyance of the transversal conveyor, comes to lie on the said transversal conveyor between two articles deposited by the first preceding transfer wheel and wherein each said transfer wheel comprises a plurality of extendible and retractable engaging elements arranged radially on said transfer wheel and means for controlling the extension of said engaging elements so that they project radially into operative position and the retraction of said engaging elements so that they retract into inoperative position, said engaging elements being adapted to engage the articles abutting against an abutment element in correspondence of the delivery end of the parallel conveyors and to push them through an arcuate guide channel which leads to the transversal conveyor.

2. A transferring and combining device according to claim 1, in which the second transfer wheel, i.e. the wheel which is arranged subsequently after the other transfer wheel, or first transfer wheel, in the direction of conveyance of the transversal conveyor, deposits the articles directly on the said transversal conveyor, while the first transfer wheel deposits the articles on a pair of supporting ridges (23) arranged in correspondence of the sides of the transversal conveyor, the articles being pushed from said ridges onto the said transversal conveyor by pushing members arranged on the transversal conveyor itself.

3. A transferring and combining device according to claim 1 or 2, in which the means for controlling the radial extension or retraction of the extendible and retractable engaging elements comprise sensor means (21) which sense the length of the row of articles being formed on each one of the parallel conveyors, said sensor means being operatively associated through a suitable circuital arrangement, to actuation means which extend or retract the said engaging elements respectively into operative or unoperative position, whereby the said engaging elements are sequentially retracted into unoperative position whenever the length of the articles on the parallel conveyor does not reach a predetermined minimum, thus stopping the transfer of said articles from the said parallel conveyor to the transversal conveyor.

* * * * *